(12) United States Patent
Bigelow

(10) Patent No.: US 8,550,406 B2
(45) Date of Patent: Oct. 8, 2013

(54) SPACECRAFT MAGNETIC SHIELD

(75) Inventor: Robert T. Bigelow, Las Vegas, NV (US)

(73) Assignee: Bigelow Aerospace, Las Vegas, NV (US)

( * ) Notice: Subject to any disclaimer, the term of this patent is extended or adjusted under 35 U.S.C. 154(b) by 299 days.

(21) Appl. No.: 13/134,733

(22) Filed: Jun. 15, 2011

(65) Prior Publication Data

US 2012/0318928 A1 Dec. 20, 2012

(51) Int. Cl.
*B64G 1/52* (2006.01)

(52) U.S. Cl.
USPC ..................................... 244/171.7; 244/158.1

(58) Field of Classification Search
USPC .......... 244/158.1, 159.1, 171.7, 171.8, 172.6, 244/166
See application file for complete search history.

(56) References Cited

U.S. PATENT DOCUMENTS

| | | | |
|---|---|---|---|
| 7,780,118 B2* | 8/2010 | Bigelow | 244/171.7 |
| 2009/0084903 A1* | 4/2009 | Kinstler | 244/171.7 |
| 2011/0049303 A1* | 3/2011 | Bamford et al. | 244/171.7 |

* cited by examiner

*Primary Examiner* — Timothy D Collins
*Assistant Examiner* — Jamie S Stehle
(74) *Attorney, Agent, or Firm* — Franklin E. Gibbs

(57) ABSTRACT

A spacecraft magnetic shield apparatus is disclosed. One embodiment has an armature attached at one end of a spacecraft and an electromagnet attached to the other end. A computer determines the position of the armature and electromagnet in relation to the spacecraft, and a power source powers the electromagnet. In operation, the positioning of the electromagnet is generally in line with incoming charged particles or ion radiation and powering of the electromagnet creates a magnetic field that deflects a percentage of the incoming charged particles or ion radiation from directly impacting the spacecraft.

5 Claims, 1 Drawing Sheet

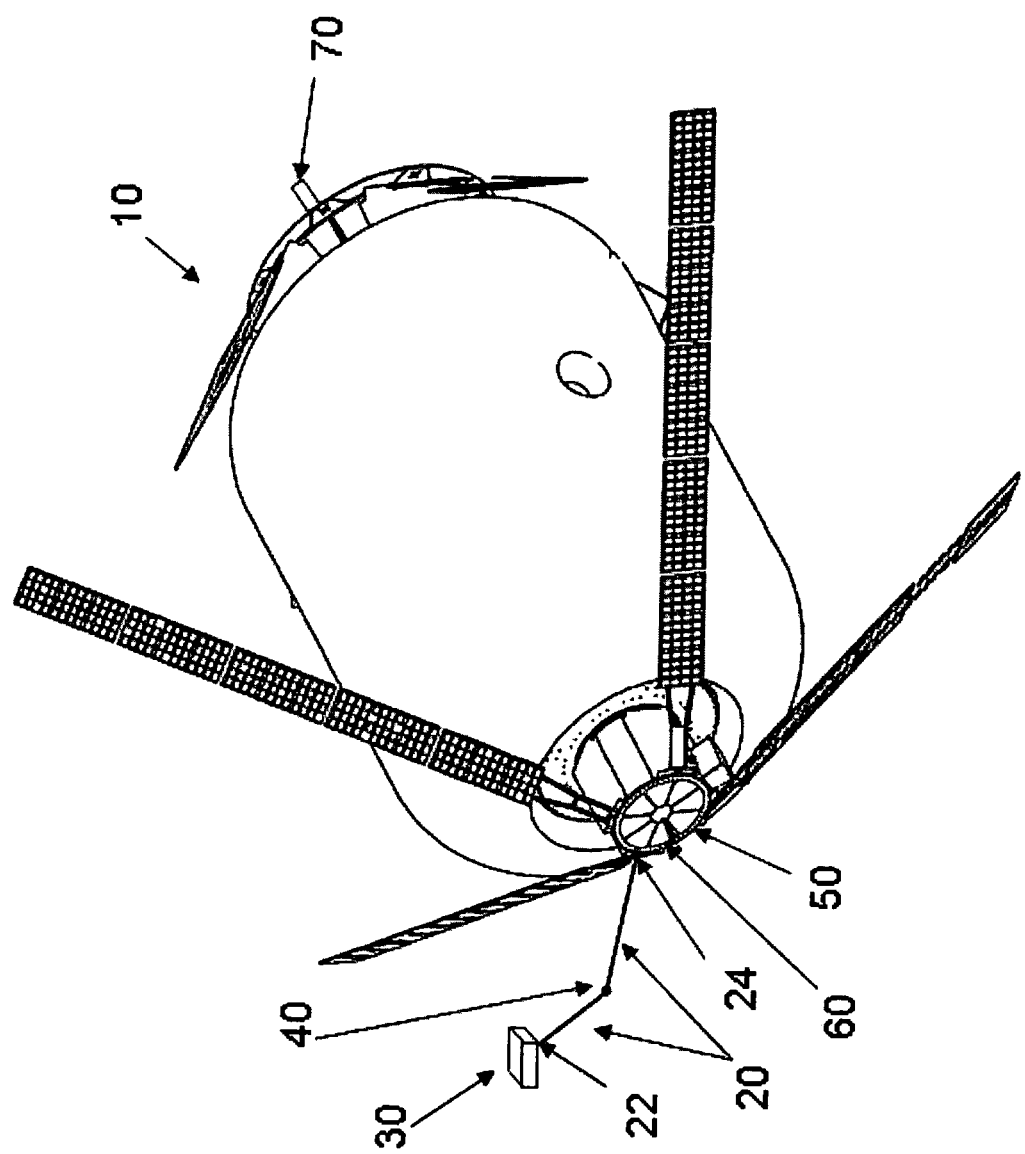

SPACECRAFT MAGNETIC SHIELD

FIELD OF THE INVENTION

This invention generally relates to magnetic shields for use with a deployed spacecraft.

BACKGROUND OF THE INVENTION

Missions in space face the problem of spacecrafts being exposed to a wide range of radiation. One type of radiation involves charged particles and ions, which can have a deteriorating effect on the outside surface of spacecrafts and can damage external equipment such as solar cells and sensors.

The source of this radiation can vary (e.g., solar flares and cosmic rays) as can the velocities and charges of the particles and ions. Fortunately, the trajectory of these types of charged particles and ions can be altered in a number of ways.

For example, an electrostatic field could change the path of charged particles. However, generating large electrostatic fields around a spacecraft can create its own set of problems. This includes the possible effect of such a field on electronic equipment. Further, there is no low-cost means at present to deploy a power source to create such fields for a spacecraft.

Another method to protect against this dangerous radiation would be the use of heavy shielding. However, this method tends to be cost prohibitive due to the expense of placing such heavy shielding into space.

A preferable alternative is the use of magnetic fields. Moving charged particles interact with the magnetic field and the result can be a deflection of the particle. In such a case, it would be desirable to generate a powerful field to entirely protect a spacecraft from all directions and from all types of incoming particles. Unfortunately, generating such a field around a spacecraft requires a great deal of energy especially for larger crafts. Usually such energy sources are not available for spacecraft at present that are sufficiently light and cost effective to be used for such an application.

What is needed is a magnetic shield that can protect specific parts of a spacecraft that are more likely to be subjected to charged particles or ion radiation, while not requiring that the entire craft be protected by the shield.

SUMMARY OF THE INVENTION

A spacecraft magnetic shield apparatus is disclosed. There is an armature having a first end and a second end, the first end connected to a spacecraft. There is also an electromagnet connected to the second end of the armature. A computer determines the position of the armature and electromagnet in relation to the spacecraft, and a power source powers the electromagnet. In operation, the positioning of the electromagnet is generally in line with incoming charged particles or ion radiation and the powering of the electromagnet creates a magnetic field that deflects a percentage of the incoming charged particle or ion radiation from directly impacting the spacecraft.

BRIEF DESCRIPTION OF THE DRAWINGS

The invention is generally shown by way of reference to the accompanying drawings in which:

FIG. 1 is a view of an expandable habitable module having a magnetic shield.

DETAILED DESCRIPTION OF THE INVENTION

Turing to FIG. 1, an expandable spacecraft 10 is shown with an armature 20 having an electromagnet 30 at the end of the armature 20 having a first end 22 and a second end 24. The electromagnet 30 sets up a magnetic field (B) that interacts with charged particles according to the Lorentz force equation expressed by:

$$F = q\left(E + \frac{v}{c} \times B\right)$$

Where v is the velocity of a charged particle represented as a vector and B is the magnetic field also represented as a vector. When there is no electric field (E) present, the equation reduces to:

Due to the cross product, this equation is often conceptualized by the right hand rule. Thus, the resultant force on a moving charged particle (F) is in the direction perpendicular to the plane formed by v and B with a magnitude dependent upon the magnitudes of v and B as well as the sine of the angle between v and B. Naturally, the charge of the particle (+ or −) will determine the side of the plane on which the force vector results.

One consideration not identified in the above equation is the mass of the charged particle. Newton's second law states that:

$$F=ma$$

The magnitude of the force (F) is directly proportional to the mass (M). In space there are not only charged particles such as electrons and protons, there are also atoms that may be charged such as atomic oxygen. The mass of incident particles can range from the subatomic to larger ions. Thus, the force that can result from the interaction between the velocity of the particle or ion, the charge, atom and the magnetic field can vary greatly. This can be complicated by particles and ions traveling at relativistic velocities. Furthermore, secondary radiation caused by interaction of the charged particles and/or ions with the magnetic field are also usually present to some degree.

Another consideration is that charged particles could form plasmas associated with the magnetic field generated by a spacecraft. One famous case on a large scale is the Van Allen radiation belt. In that case there is a torus of energetic charged particles (plasma) in space around the Earth, which is held in place by Earth's magnetic field. Such a condition would not be desirable in the vicinity of a spacecraft.

There are several ways the invention could address this concern to varying degrees. In one embodiment, Maxwell's first equation provides a possible solution:

$$\nabla \times B = \mu_0 J + \mu_0 \varepsilon_0 \frac{\partial E}{\partial t}$$

Here, the magnetic field (B) is dependent upon the rate of change of the electrical field (E). Thus, by using an electromagnet and varying the E field, the spacecraft could create a condition of a varying B field. The change in the B field could be calibrated to reduce the probability of charged particles or ions forming concentrated plasmas in the vicinity of the spacecraft.

Returning to the Lorentz equation, the force on the charged particles or atoms can be affected by the cross product between the velocity vector and the magnetic field. Thus, altering the geometry of the magnetic field could set up a condition that could also prevent plasmas forming near the spacecraft.

Thus, in one embodiment the electromagnet 30 can be comprised of a variety of coil windings such as different configurations of cylindrical coils. Activation of one or more cylinders at specific times and with specific current and potential would provide a generally localized varying magnetic field. The interaction of the magnetic field and charged particles or atoms could divert the incoming charged particles or ions away from specific areas of the spacecraft. It is important to note that the invention is not limited to any single type of winding configuration. In another embodiment, the electromagnet can be pivotal in relation to the first end of the armature 22.

As FIG. 1 identifies, in one embodiment the armature 20 has a pivot 40. The armature can pivot or turn to locate the electromagnet 30 at different locations. In another embodiment, the armature 20 can be connected to a track 50 so that the base of the armature 60 can be moved in relation to the spacecraft. In FIG. 1 the track is located at one end of the spacecraft. In other embodiments, the track can extend the entire length of the spacecraft or partially the length of the spacecraft.

Also disclosed is a sensor 70 that detects the level of charged particles and atoms in space near to the spacecraft. The information gathered can be used to determine the location of the electromagnet, the geometry of the magnetic field, and the strength of the magnetic field to affect the greatest result.

In another embodiment, the sensor 70 detects the direction of charged particles and a computer, utilizing this information, could alter the course or orientation of the spacecraft in the most effective manner to allow the armature 20 and the electromagnet 30 to be positioned to deflect the incoming particles. In another embodiment, the armature 20 could be telescopic. The electromagnet 30 could be extended further from or closer to the spacecraft.

In the case where a spacecraft is oriented in a position where a larger flux of particle radiation can be relatively constant in relation to other angles of incidence on the spacecraft, a sensor may not be necessary. This could be the case of a spacecraft oriented in a manner that one side of the craft faces the Sun for a long period of time and the spacecraft may be impacted by the result of solar flares.

It is not required that all incoming charged particles and ion radiation be deflected by the electromagnet 30. In one embodiment, the electromagnet 30 is placed to deflect some of the radiation over a particular portion of the craft. This portion may contain sensitive equipment. The power source in the spacecraft for powering the electromagnet could be batteries, solar cells, or a nuclear source as non-exhaustive examples.

Another way that the magnetic shielding can be produced is with a plurality of electromagnets either on a single armature or multiple armatures. Each electromagnet could be designed for different configurations. Furthermore, electromagnets could have a permanent magnet core.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A spacecraft magnetic shield apparatus comprising:
an armature having a first end and a second end, the first end adapted for being connected to a spacecraft;
an electromagnet connected to the second end of the armature;
a computer determining the position of the armature and electromagnet in relation to the spacecraft; and
a power source powering the electromagnet;
wherein the positioning of the electromagnet is generally in line with incoming charged particles or ion radiation and powering of the electromagnet creates a magnetic field that deflects a percentage of the incoming charged particles or ion radiation from directly impacting the spacecraft.

2. The spacecraft magnetic shield apparatus of claim 1 wherein the armature is telescopic.

3. The spacecraft magnetic shield apparatus of claim 1 wherein the armature has a pivot disposed between the first end and the second end.

4. The spacecraft magnetic shield apparatus of claim 1 further comprising a track disposed between the spacecraft and the first end of the armature wherein the armature is adapted for movement along the track.

5. The spacecraft magnetic shield apparatus of claim 1 wherein the electromagnet has a permanent magnet element.

* * * * *